United States Patent
Watanabe

(10) Patent No.: US 6,593,859 B1
(45) Date of Patent: Jul. 15, 2003

(54) DATA PROCESSING APPARATUS

(75) Inventor: Hajime Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/511,309

(22) Filed: Feb. 23, 2000

(30) Foreign Application Priority Data

Feb. 23, 1999 (JP) .......................................... 11-043978

(51) Int. Cl.$^7$ ............................................ H03M 11/00
(52) U.S. Cl. ............................ 341/20; 341/22; 361/681
(58) Field of Search ...................... 341/20, 22; 361/680, 361/681, 683

(56) References Cited

U.S. PATENT DOCUMENTS

| 5,175,672 A | | 12/1992 | Conner et al. |
| 6,028,764 A | * | 2/2000 | Richardson et al. ......... 361/681 |
| 6,421,235 B2 | * | 7/2002 | Ditzik ........................ 361/683 |

FOREIGN PATENT DOCUMENTS

| EP | 0834792 A2 | 4/1998 |
| JP | 05-158579 A | 6/1993 |
| JP | A5313786 | 11/1993 |
| JP | 08-030353 A | 2/1996 |

OTHER PUBLICATIONS

English Translation of Action mailed Jul. 31, 2002—Korean Intellectual Property Office Notice of Request for Submission of Argument.
Patent Abstracts of Japan—Abstract only—Publication No. JP11282611—Publication Date Oct. 15, 1999.
Patent Abstracts of Japan—Abstract only—Publication No. 05216830—Publication Date Aug. 27, 1993.

* cited by examiner

Primary Examiner—Timothy Edwards
(74) Attorney, Agent, or Firm—Birch, Stewart, Kolasch & Birch, LLP.

(57) ABSTRACT

A data processing apparatus has a body portion incorporating a basic circuit and having a display panel provided on the front face thereof, a support portion rotatably linked to an end portion of the body portion, a key input portion detachably linked to an end portion of the support portion, and a communication portion for communicating data entered in the key input portion to the body portion on a cordless basis when the key input portion is detached from the support portion.

8 Claims, 5 Drawing Sheets

DATA PROCESSING APPARATUS

BACKGROUND OF THE INVENTION

1. Field of the Invention

The present invention relates to a data processing apparatus, such as a personal computer or word processor, composed of a body portion having a display panel provided on the front face thereof and a key input portion linked to an end portion of the body portion.

2. Description of the Prior Art

A type of data processing apparatus is conventionally known that is composed of a body portion incorporating a basic circuit and having a display panel provided on the front face thereof and a key input portion linked to the body portion. Some of this type of data processing apparatus are designed to allow themselves to be brought into one of the following three states:

(1) a state in which the key input portion is so located as to cover the display panel face, i.e. the state in which the data processing apparatus is conveniently stored or transported;

(2) a state in which, as compared with the state (1) above, the body portion is rotated up (unfolded) so as to allow the display panel face to face the operator, i.e. the state in which the data processing apparatus is used with the key input portion attached to the body portion; and (3) a state in which, as compared with the state (2) above, the key input portion is detached from the body portion and an additional support member is attached to the body portion so that the body portion will be supported stably even then, i.e. the state in which the data processing apparatus is used with the key input portion detached from the body portion.

A conventional example of a data processing apparatus that can be brought into one of the states (1) to (3) described above is disclosed in Japanese Laid-Open Patent Application No. H5-313786.

However, according to Japanese Laid-Open Patent Application No. H5-313786 mentioned above, when the state of the data processing apparatus is changed from the state (1) above to the state (2) above, and further from the state (2) above to the state (3) above, to achieve stable support of the body portion even with the key input portion detached therefrom, it is necessary to insert a support member into a hole or holes formed in the rear face of the body portion. This not only demands extra operation steps but also leads easily to loss of the support member if it drops out.

Moreover, it is necessary to form, in the rear face of the body portion, a recessed portion in which the support member is kept when retracted and a hole or holes into which it is inserted. This inevitably increases the thickness of the body portion and thus spoils the portability and storability thereof.

Moreover, to permit the support member to support the body portion at a desired angle, it is necessary to design a complicated structure, for example, having a hole or holes that are so formed as to allow the support member to be inserted therein at a number of angles.

Furthermore, the size of the key input portion is made substantially identical with that of the body portion, and thus the former becomes larger as the latter becomes larger. This not only spoils the portability of the key input portion but also creates unnecessary space therein.

Moreover, as the body portion becomes larger, it becomes less stable in the state (3) above and is thus more prone to topple down when subjected to vibrations or a shock.

SUMMARY OF THE INVENTION

An object of the present invention is to provide a data processing apparatus that can be brought into one of the states (1) to (3) described above without requiring any extra support member, without requiring any extra portion to keep or insert such a member in, and thus without requiring a body portion to be made thicker and that nevertheless achieves stable support of the body portion in a simple structure.

To achieve the above object, according to one aspect of the present invention, a data processing apparatus is provided with: a body portion incorporating a basic circuit and having a display panel provided on the front face thereof; a support portion rotatably linked to an end portion of the body portion; a key input portion detachably linked to an end portion of the support portion; and a communication portion for communicating data entered in the key input portion to the body portion on a cordless basis when the key input portion is detached from the support portion.

According to another aspect of the present invention, a data processing apparatus is provided with: a body portion incorporating a basic circuit and having a display panel provided on the front face thereof; a support portion rotatably linked to an end portion of the body portion; and a key input portion detachably linked to an end portion of the support portion. Here, the data processing apparatus can be brought into any one of the following three states: a first state in which the support portion together with the key input portion linked thereto covers the face of the body portion on which the display panel is provided; a second state in which, as compared with the first state, the support portion together with the key input portion linked thereto is placed on a flat surface and the face of the body portion on which the display panel is provided is rotated up so as to face an operator; and a third state in which, as compared with the second state, the key input portion is detached from the support portion and the support portion is rotated backward so as to be placed on the flat surface behind the body portion.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, a data processing apparatus embodying the present invention will be described with reference to the accompanying drawings.

Figure 1:
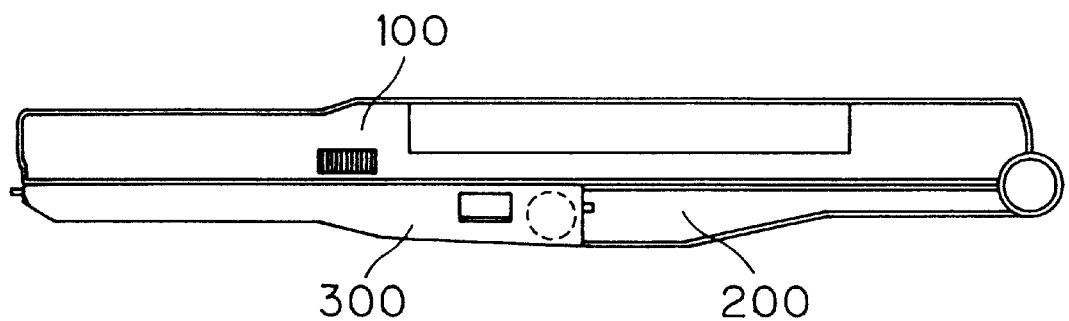
FIG. 1 is a side view of a data processing apparatus embodying the invention, showing its first state into which it is brought into when not in use.

FIG. 1 is a side view of the appearance of a data processing apparatus embodying the invention, showing its "folded-up" state into which it is brought into when not in use; that is, FIG. 1 shows its first state in which a key input portion and a support portion are linked together and are so located as to cover the display panel face of a body portion.

Figure 4:
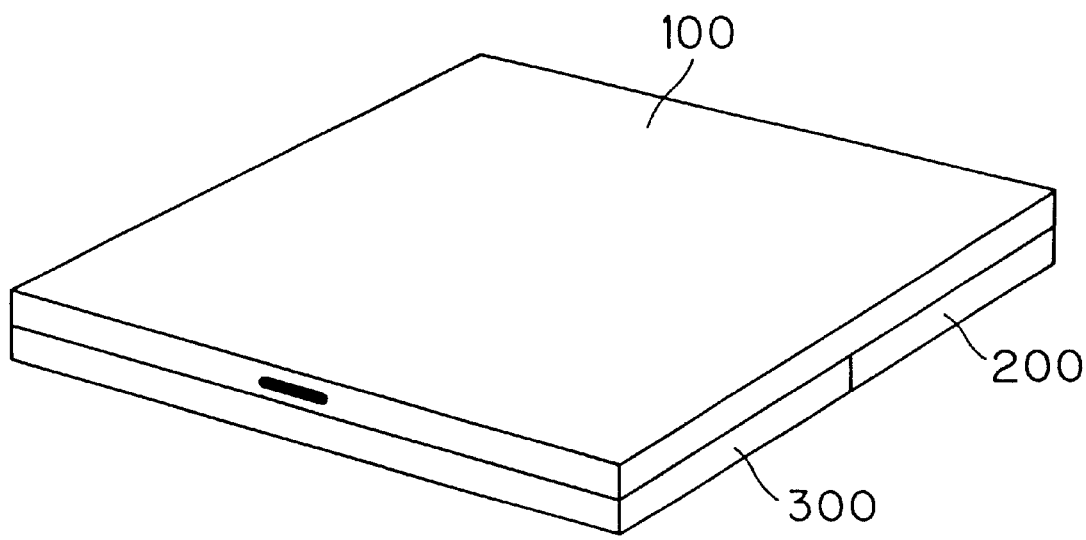
FIG. 4 is a schematic perspective view of the data processing apparatus embodying the invention, showing its first state into which it is brought into when not in use.

In FIG. 1, reference numeral 100 represents a body portion, reference numeral 200 represents a support portion, and reference numeral 300 represents a key input portion. Usually, the data processing apparatus is brought into this state when not in use, in particular when kept in storage or transported. To facilitate the understanding of FIG. 1, a schematic perspective view of the same state is shown in FIG. 4.

Figure 2:
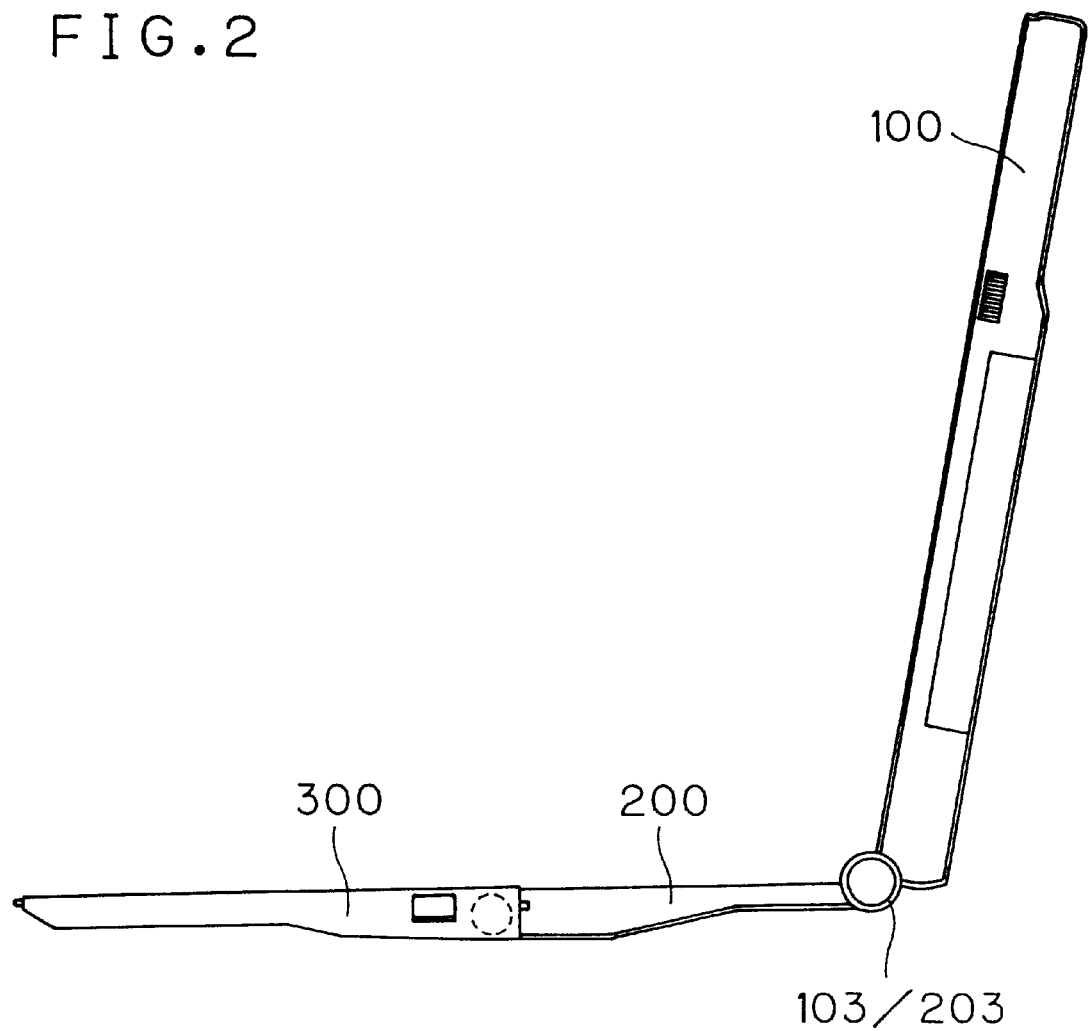
FIG. 2 is a side view of the data processing apparatus embodying the invention, showing its second state into which it is brought into when in use.
Figure 5:
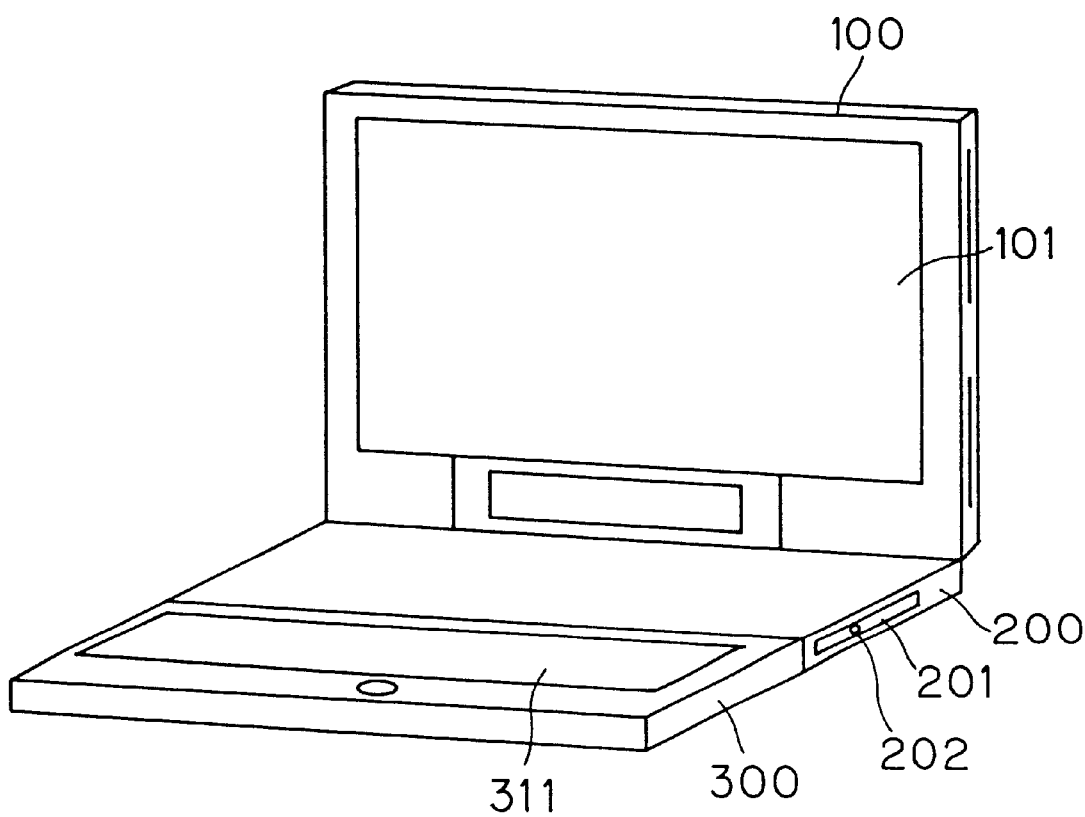
FIG. 5 is a schematic perspective view of the data processing apparatus embodying the invention, showing its second state into which it is brought into when in use.

FIG. 2 is a side view of the appearance of the data processing apparatus embodying the invention, showing its "unfolded" state; that is, FIG. 2 shows its second state in which, as compared with the first state, the support portion 200 together with the key input portion 300 linked thereto is placed on a flat surface and the body portion 100 is rotated up so as to allow the display panel face to face the operator. To facilitate the understanding of FIG. 2, a schematic perspective view of the same state is shown in FIG. 5.

Figure 3A:
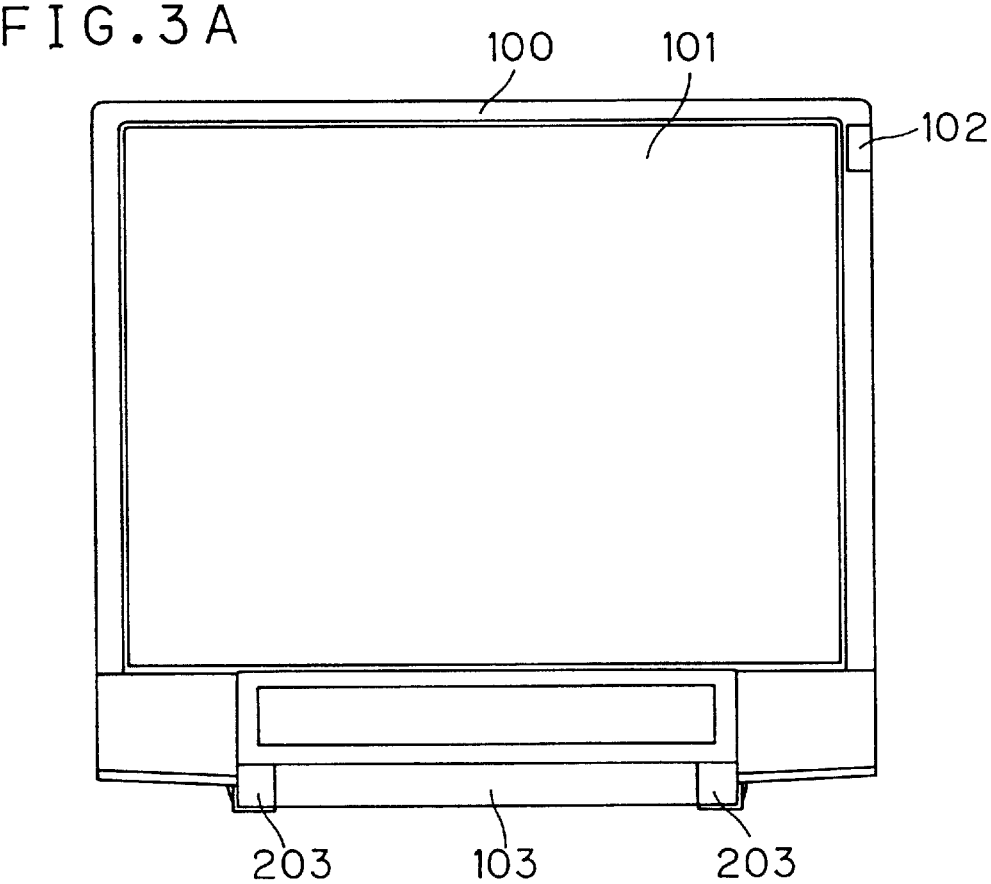
FIGS. 3A and 3B are a front view and a side view, respectively, of the data processing apparatus embodying the invention, showing its third state into which it is brought into when the key input portion is detached.
Figure 3B:
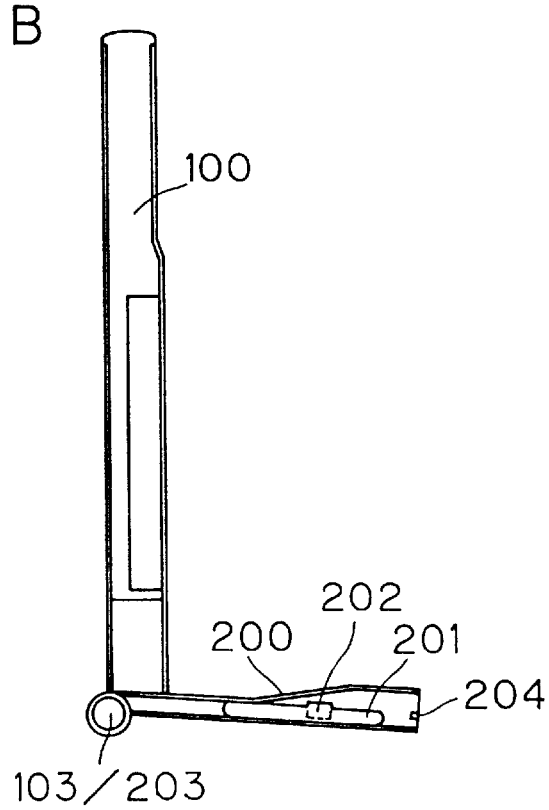

FIGS. 3A and 3B are a front view and a side view, respectively, of the appearance of the data processing apparatus embodying the invention, showing its state in which, as compared with the second state, the key input portion 300 is detached from the support portion 200.

Figure 6:
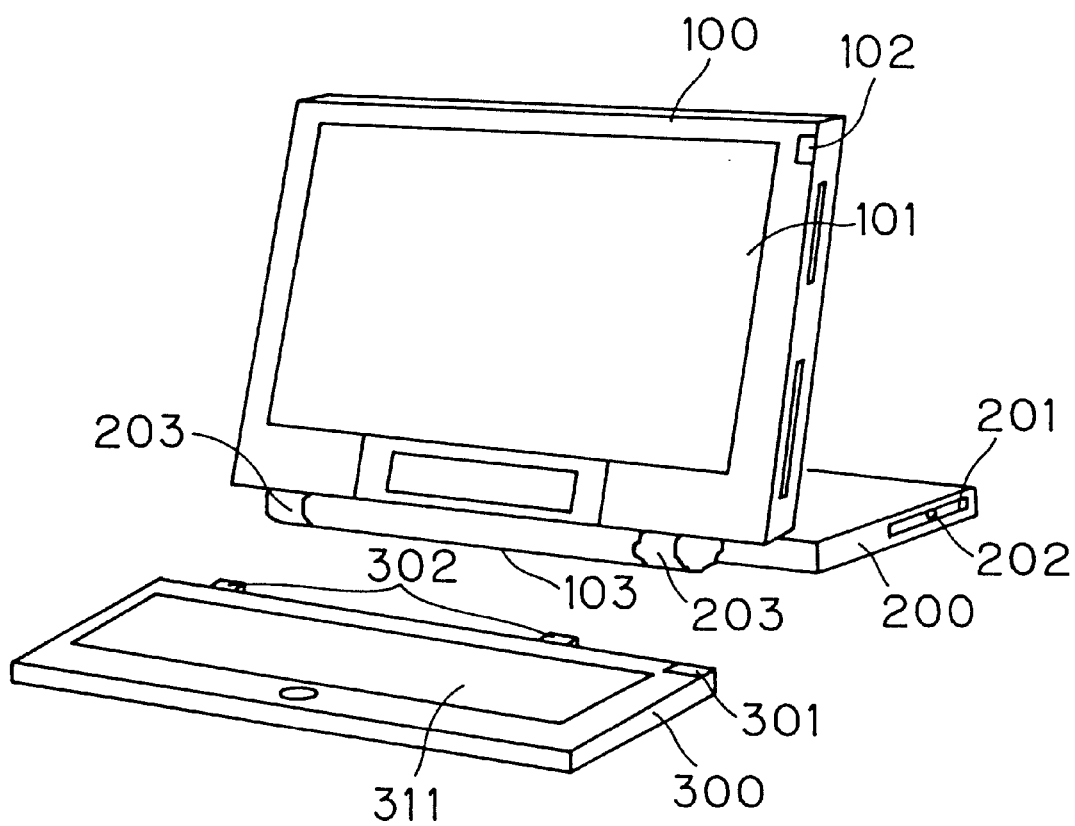
FIG. 6 is a schematic perspective view of the data processing apparatus embodying the invention, showing its third state into which it is brought into when the key input portion is detached.

That is, FIGS. 3A and 3B show the third state of the data processing apparatus in which, as compared with the second state shown in FIG. 2, the support portion 200 is rotated backward to behind the body portion 100 to achieve stable support of the body portion 100 even with the key input portion 300 detached. It is to be noted that, in both of the front and side views FIGS. 3A and 3B, the key input portion 300 is omitted. To facilitate the understanding of FIGS. 3A and 3B, a schematic perspective view of the same state is shown in FIG. 6.

The body portion 100 is provided with a display panel 101, a receiver 102, and a body-portion-side hinge 103, and incorporates a basic circuit, for controlling the entire data processing apparatus, composed of a CPU, ROM, RAM, and others.

The display panel 101 is an LCD (liquid crystal display) panel, and is so arranged as to be exposed on the front face of the body portion 100 and laid over the basic circuit incorporated in the body portion 100.

The receiver 102 is provided with an infrared communication function that allows the body portion 100 to receive, on a cordless basis, the data entered in the key input portion 300 and transmitted from the transmitter (described later) provided therein. To obtain the optimum communication conditions, it is preferable that this receiver 102 be provided in an upper-end portion of the body portion 100 so that, irrespective of whether the data processing apparatus is in the second state shown in FIG. 5 or in the third state shown in FIG. 6, the cordless communication between the body portion 100 and the key input portion 300 will not be intercepted by the casing of the data processing apparatus or other obstacles.

The body-portion-side hinge 103 is provided in a lower-end portion of the body portion 100. The body-portion-side hinge 103, together with support-portion-side hinges (described later), links the body portion 100 and the support portion 200 together in such a way that the support portion 200 is rotatable from the first state shown in FIG. 4, to the second state shown in FIG. 5, and further to the third state shown in FIG. 6.

The support portion 200 supports the body portion 100, and is provided with a battery 201 for the body portion 100, a power inlet 202, support-portion-side hinges 203, fitting holes 204 that allow the key input portion 300 to be linked to the support portion 200, and others.

The battery 201 supplies the body portion 100 with electric power from which the display panel 101, the basic circuit, and others operate. The power inlet 202 allows electric power to be fed in from the outside.

The support-portion-side hinges 203 are provided in an end portion of the support portion 200. The support-portion-side hinges 203, together with the body-portion-side hinge 103, link the body portion 100 and the support portion 200 together in such a way that the support portion 200 is rotatable from the first state shown in FIG. 4, to the second state shown in FIG. 5, and further to the third state shown in FIG. 6.

The fitting holes 204, into which the fitting projections (described later) provided on the key input portion 300 are inserted in the first and second states shown in FIGS. 4 and 5, thereby allow the support portion 200 and the key input portion 300 to be linked together.

The body portion 100 and the support portion 200 are so designed as to allow the body portion 100 to be fixed at a desired angle relative to the support portion 200 in the second and third states shown in FIGS. 5 and 6. This is achieved, for example, by securing a certain friction in the linkage between the body-portion-side hinge 103 and the support-portion-side hinges 203.

As shown in FIG. 6, the key input portion 300 is provided with a transmitter 301, fitting projections 302, a battery (not shown) for the key input portion 300, input devices such as a key board 311 and a pointing device (i.e. a mouse, tablet, or the like) for entering character-based, graphic, or other data, and others.

The transmitter 301 is provided with an infrared communication function that allows the data entered in the key input portion 300 to be transmitted, on a cordless basis, to the receiver 102 of the body portion 100.

The fitting projections 302, which are inserted into the fitting holes 204 (see FIG. 3B) provided in the support portion 200 in the first and second states shown in FIGS. 4 and 5, thereby allow the support portion 200 and the key input portion 300 to be linked together.

The body portion 100, the support portion 200, and the key input portion 300 are so sized that the support portion 200 and the key input portion 300, when linked together as in the first state shown in FIG. 4, are approximately as large as the body portion 100.

Thus, the data processing apparatus embodying the invention can be brought into the first state shown in FIG. 4 when it is not in use such as when it is kept in storage or transported. On the other hand, when this data processing apparatus is used, it can be brought into either the second state shown in FIG. 5 in which the support portion 200 and the key input portion 300 are linked together or into the third state shown in FIG. 6 in which the support portion 200 and the key input portion 300 are detached from each other. In this way, the body portion 100 can be supported stably in a simple structure that does not require a support member to be attached to the rear face of the body portion 100. Moreover, there is no need to provide a portion to keep or insert such a member in, and therefore the body portion 100 can be made accordingly thinner.

Moreover, the body portion 100 and the key input portion 300 exchange the entered data on a cordless basis, and therefore, in the third state shown in FIG. 6, the detached key input portion 300 does not need to be connected to the body portion 100 by way of a cable or the like. This facilitates key input operation.

Furthermore, the support portion 200 and the key input portion 300, when linked together, are approximately as large as the body portion 100, and therefore, by making the support portion 200 sufficiently large relative to the body portion 100, the body portion 100 can be supported stably so as not to topple down easily when the data processing apparatus is used in the third state shown in FIG. 6.

Moreover, the relatively heavy battery 201 for the body portion 100 is provided in the support portion 200. Providing such a heavy member in the support portion 200 helps achieve stable support of the body portion 100 by preventing it from toppling down when subjected to vibrations or a shock.

Figure 7:
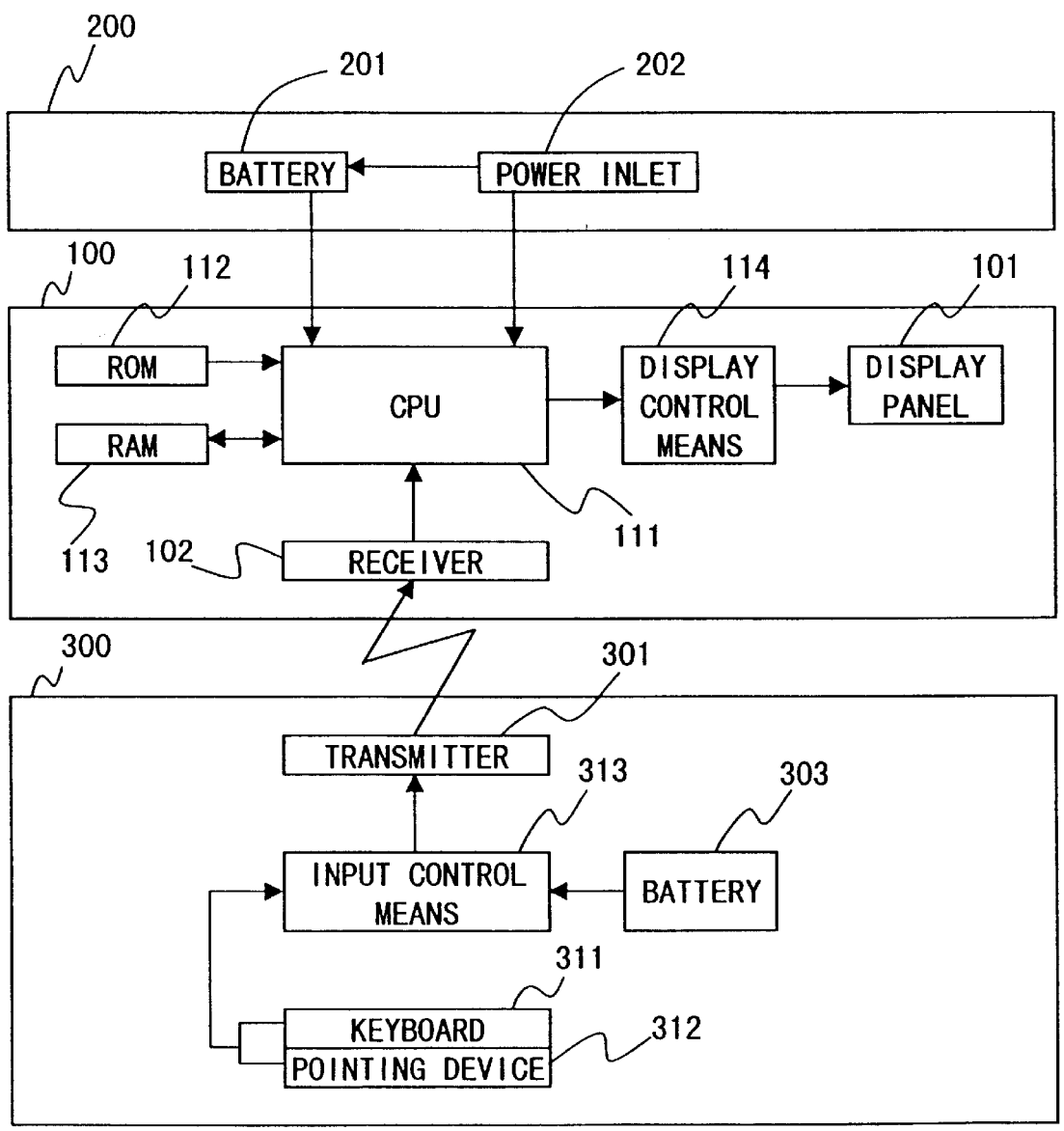
FIG. 7 is a block diagram showing an example of the hardware configuration of the data processing apparatus embodying the invention.

FIG. 7 is a block diagram showing an example of the hardware configuration of the data processing apparatus of this embodiment.

As shown in FIG. 7, the body portion 100 has a display panel 101, a receiver 102, a CPU 111, a ROM 112, a RAM 113, and display control means 114.

The CPU 111 controls the entire data processing apparatus by executing a program for controlling the data processing apparatus stored in the ROM 112. The ROM 112 is used to store, in addition to the above-mentioned program executed by the CPU 111, the data used thereby and the data related to input/output operation, such as the codes of characters that can be displayed. The RAM 113 is used to store temporarily the results of the operation executed by the CPU 111, the entered data received by the receiver 102, and other data.

The display control means 114 is, for example, a liquid crystal display driving circuit for controlling a liquid crystal display device. The display control means 114 serves to control the display on the display panel 101 by controlling, on a hardware basis, the display device on which to achieve display, and thereby permits characters and images entered from the key input portion 300 to be displayed on the display panel 101.

As shown in FIG. 7, the support portion 200 has a battery 201 for the body portion 100 and a power inlet 202.

The battery 201 for the body portion 100 supplies electric power to the body portion 100. The power inlet 202 allows electric power to be fed in from the outside and then fed, through the battery 201 or directly, to the body portion 100.

As shown in FIG. 7, the key input portion 300 has a transmitter 301, a battery 303 for the key input portion 300, a keyboard 311, a pointing device 312, and input control means 313.

The input control means 313 controls data entry from the keyboard 311 and the pointing device 312, and feeds the entered data to the transmitter 301.

In the embodiment described above, an LCD (liquid crystal display) panel is used as the display panel 101; however, it is also possible to use instead a display device of any other type such as a plasma display.

Moreover, instead of using infrared communication between the receiver 102 and the transmitter 301, it is also possible to use any means that allows communication on a cordless basis such as a wireless system using a radio wave.

Moreover, instead of providing fitting holes 204 in the support portion 200 and fitting projections 302 on the key input portion 300, it is also possible to provide fitting projections on the support portion 200 and fitting holes in the key input portion 300 to link the support portion 200 and the key input portion 300 together. Alternatively, it is also possible to provide each of the support portion 200 and the key input portion 300 with both a fitting projection and a fitting hole. That is, the support portion 200 and the key input portion 300 may be linked together in any manner as long as they can be linked together easily and firmly.

Moreover, although not shown in the figures, to allow the body portion 100 to be fixed to the support portion 200 and the key input portion 300 linked together in the first state shown in FIG. 1, hook slots are provided in the support portion 200 and in the key input portion 300, in appropriate positions thereon that face the portion around the display panel 101 of the body portion 100, and hooks are provided in the portion around the display panel 101 of the body portion 100, in the positions thereon that face those hook slots. These hooks are inserted into the corresponding hook slots so as to be engaged therewith, and this helps prevent the body portion 100 from being unfolded easily.

Instead of providing hooks on the body portion 100 and hook slots in the support portion 200 and in the key input portion 300, it is also possible to provide hook slots in the body portion and hooks on the support portion 200 and on the key input portion 300 to fix the body portion 100 to the support portion 200 and the key input portion 300 linked together.

Moreover, even when the data processing apparatus is left unused, as when it is kept in storage or transported, with the key input portion 300 detached from the support portion 200, the support portion 200 alone can be rotated so as to cover the display panel face, with the hooks of the body portion 100 engaged with the hook slots of the support portion 200. This helps keep the support portion 200 covering part of the display panel face without rotating into an unfolded position, and thereby prevent the display panel face from being uncovered wholly.

Instead of using a key board 311 and a pointing device 312 (i.e. a mouse, tablet, or the like) as input devices in the key input portion 300 to allow entry of character-based, graphic, or other data, it is also possible to use a tablet integral with a display using a liquid crystal display panel.

It is possible to allow the use of the transmitter 301 and the receiver 102 also in the states other than when the key input portion 300 is detached from the support portion 200; for example, it is possible to provide additionally a mode selection function or the like so that their use will be allowed even when the key input portion 300 is not detached from the support portion 200.

In that case, the communication portion provided in the body portion 100 and in the key input portion 300 allows exchange of data on a cordless basis irrespective of whether the key input portion 300 is detached from the support portion 200 or not. Thus, when the key input portion 300 is not detached from the support portion 200, it is possible to communicate data either on a direct-link basis or on a cordless basis. This helps enhance data security.

It is to be understood that, within the scope of the appended claims, the present invention may be practiced in any other manner than is specifically described above.

What is claimed is:

1. A data processing apparatus comprising:
   a body portion including circuit means for controlling the data processing apparatus and having a display panel provided on a front face thereof;
   a support portion including a body member having a rear end portion rotatably linked to a lower end portion of the body portion so as to be integral therewith and inseparable therefrom and sized to support, by itself, the body portion in a generally upright position on a support surface apart from a key input portion;
   a key input portion that has a top surface thereof formed within an identical plane with a top surface of the body member and that is detachably linked to a front end portion of the body member of the support portion; and
   a communication portion for communicating data entered in the key input portion to the body portion on a cordless basis when the key input portion is detached from the support portion.

2. A data processing apparatus as claimed in claim 1, wherein the communication portion comprises:
   a transmitter provided in the key input portion so as to transmit the data entered in the key input portion on a cordless basis; and
   a receiver provided in the body portion so as to receive the data transmitted from the transmitter on a cordless basis.

3. A data processing apparatus as claimed in claim 1 wherein the body member of the support portion has a size which is substantially equal to or less than one half the size of the body portion.

4. A data processing apparatus as claimed in claim 1 wherein a source of DC power for the body portion is located in the body member of the support portion.

5. A data processing apparatus as claimed in claim 4 wherein the source of DC power comprises a battery for supplying electric power to the body portion and for providing a weight for stabilizing the body portion.

6. A data processing apparatus comprising:
   a body portion including a circuit for controlling the apparatus and having a display panel provided on a front face thereof;
   a rotatable support portion linked to an end portion of the body portion so as to be integral therewith and inseparable therefrom and being sized to alone support the body portion in a stable generally upright position on a support surface; and
   a key input portion detachably linked to an end portion of the support portion,
   wherein the data processing apparatus can be brought into any one of the following three states:
      a first state in which the support portion together with the key input portion linked thereto covers the face of the body portion on which the display panel is provided;
      a second state in which the support portion together with the key input portion linked thereto is placed on a flat surface and the body portion is supported so as to be held in an inclined position away from the support portion and toward the rear of the display panel by the weight of the key input portion and the support portion; and
      a third state in which the support portion, detached from the key input portion, is rotated behind the display panel and placed on a flat surface and the body portion is supported so as to be held in an inclined position toward the rear of the display panel by the support portion receiving the weight of the body portion.

7. A data processing apparatus as claimed in claim 6, further comprising:
   a transmitter provided in the key input portion so as to transmit the data entered in the key input portion on a cordless basis; and
   a receiver provided in the body portion so as to receive the data transmitted from the transmitter on a cordless basis.

8. A data processing apparatus as claimed in claim 6, wherein the support portion and the key input portion are of a predetermined respective size and when linked together are approximately equal in size to the body portion.

* * * * *